(12) United States Patent
Ito

(10) Patent No.: US 9,177,495 B2
(45) Date of Patent: Nov. 3, 2015

(54) ELECTRO-OPTICAL DEVICE AND ELECTRONIC APPARATUS

(75) Inventor: Akihiko Ito, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 193 days.

(21) Appl. No.: 13/541,298

(22) Filed: Jul. 3, 2012

(65) Prior Publication Data

US 2013/0010006 A1  Jan. 10, 2013

(30) Foreign Application Priority Data

Jul. 4, 2011  (JP) .................... 2011-148197

(51) Int. Cl.
*G09G 3/00* (2006.01)
*G02B 27/22* (2006.01)
*G06T 15/00* (2011.01)
*G09G 3/36* (2006.01)

(52) U.S. Cl.
CPC .............. *G09G 3/003* (2013.01); *G09G 3/3648* (2013.01); *G02B 27/22* (2013.01); *G06T 15/00* (2013.01); *G09G 3/3614* (2013.01); *G09G 2310/0205* (2013.01); *G09G 2310/0224* (2013.01)

(58) Field of Classification Search
CPC ......... G06T 15/00; G02B 27/22; G09G 3/003

USPC ..................................................... 345/419, 96
See application file for complete search history.

(56) References Cited

U.S. PATENT DOCUMENTS

| | | | |
|---|---|---|---|
| 5,877,738 A * | 3/1999 | Ito et al. .......................... | 345/94 |
| 6,396,468 B2 * | 5/2002 | Matsushima et al. ........... | 345/87 |
| 7,486,265 B2 * | 2/2009 | Hosaka et al. ................... | 345/88 |
| 7,586,476 B2 * | 9/2009 | Kwon et al. ..................... | 345/98 |
| 2004/0041760 A1 * | 3/2004 | Tsumura et al. ................ | 345/87 |
| 2011/0018859 A1 * | 1/2011 | Ito ................................. | 345/213 |
| 2011/0128259 A1 * | 6/2011 | Suzuki et al. ................. | 345/204 |
| 2011/0227957 A1 * | 9/2011 | Jung et al. ..................... | 345/690 |
| 2011/0292041 A1 * | 12/2011 | Lee et al. ...................... | 345/419 |
| 2013/0215157 A1 * | 8/2013 | Shin et al. ..................... | 345/690 |
| 2014/0035894 A1 * | 2/2014 | Hsiao et al. ................... | 345/208 |

FOREIGN PATENT DOCUMENTS

JP  2009-025436 A  2/2009
JP  2011-027810 A  2/2011

* cited by examiner

*Primary Examiner* — Chanh Nguyen
*Assistant Examiner* — Yuzhen Shen
(74) *Attorney, Agent, or Firm* — Maschoff Brennan

(57) ABSTRACT

In one unit period of a display period, each pair of two scanning lines is selected and a gray scale potential corresponding to an image signal of pixels of one scanning line of each pair of scanning lines is supplied to each signal line. In another unit period, the other scanning line of each pair of scanning lines is selected and a gray scale potential corresponding to an image signal of the pixels of the other scanning line is supplied to each signal line.

7 Claims, 10 Drawing Sheets

ELECTRO-OPTICAL DEVICE AND ELECTRONIC APPARATUS

CROSS REFERENCES TO RELATED APPLICATIONS

The entire disclosure of Japanese Patent Application No. 2011-148197, filed Jul. 4, 2011 is expressly incorporated herein by reference.

BACKGROUND

1. Technical Field

The present invention relates to a technique of displaying right-eye and left-eye images having a mutual parallax effect so that an observer can perceive a stereoscopic effect.

2. Related Art

A number of frame sequential type stereoscopic viewing methods for alternately displaying right-eye and left-eye images in a time-division manner have been suggested. During the period of time where one of the right-eye and left-eye images is changed, the right-eye and left-eye images are merged. Therefore, when a viewer views the images, it may be difficult for the viewer to perceive a clear stereoscopic effect and crosstalk may result. One attempt at solving this problem is found in JP-A-2009-25436, which discloses a technique of closing both right-eye and left-eye shutters of stereoscopic viewing glasses in during the period in which right-eye and left-eye images are changed, so that a viewer may not perceive the images.

Specifically, as shown in FIG. 12, a right-eye period corresponding to the right-eye image and a left-eye period corresponding to the left-eye image are alternately set. A display image is updated from the left-eye image to the right-eye image in the first-half of the right-eye period and the right-eye image is displayed in the second-half of the right-eye period. The display image is updated from the right-eye image to the left-eye image in the first-half of the left-eye period and the left-eye image is displayed in the second-half of the left-eye period. In the first-half of each of the right-eye and left-eye periods, both the right-eye and left-eye shutters are controlled so as to be in the closed state. Accordingly, it may be difficult for the viewer to perceive the merging (crosstalk) of the right-eye and left-eye images.

In the technique disclosed in JP-A-2009-25436, however, the period in which the viewer can actually perceive the image is restricted to the second-half of each of the right-eye and left-eye periods. Accordingly, a problem may arise in that it is difficult to sufficiently ensure the brightness of the display image.

SUMMARY

An advantage of some aspects of the invention is that it provides a technique of improving the brightness of a display image, while preventing a viewer from perceiving merging right-eye and left-eye images.

One aspect of the invention is an electro-optic device which alternately displays right-eye and left-eye images in each display period. The electro-optic device includes a plurality of scanning lines including first and second scanning lines which are alternately arranged; a plurality of signal lines intersecting the plurality of scanning lines; a plurality of pixels arranged to correspond to the intersections between the scanning lines and the signal lines; a scanning line driving circuit that selects first pairs of scanning lines, which are two scanning lines adjacent to each other divided from the plurality of scanning lines, in each selection period of a first unit period of each display period, selects the first scanning lines in a second unit period after the first unit period has elapsed in each selection period, selects second pairs of scanning lines, which are two scanning lines adjacent to each other divided from the plurality of scanning lines and shifted by one scanning line from the first pair of scanning lines, in each selection period of a third unit period after the second unit period has elapsed, and selects each first pair of scanning lines in each selection period of a fourth unit period after the second unit period has elapsed; and a signal line driving circuit that supplies each signal line with a gray scale potential corresponding to a designated gray scale of the pixels of the second scanning line of the first pairs of scanning lines, supplies each signal line with a gray scale potential corresponding to a designated gray scale of the pixels of the first scanning line selected in the corresponding selection period in each selection period of the second unit period, supplies each signal line with a gray scale potential corresponding to a designated gray scale of the pixels of one scanning line of the second pairs of first and second scanning lines selected in the third unit period, and supplies each signal line with a gray scale potential corresponding to a designated gray scale of the pixels of the other scanning line of the first pair of first and second scanning lines selected in the fourth unit period.

With such a configuration, since each pair of two scanning lines is selected from the scanning lines in the first unit period of each display period and the gray scale potential is supplied to the pixels, the time in which right-eye and left-eye images are merged is shortened, compared to a case where each scanning line is sequentially selected in each display period and a gray scale potential is supplied to the pixels. Accordingly, by controlling both right-eye and left-eye shutters of stereoscopic glasses to a closed state in the merging period of the right-eye and left-eye images, the brightness of a display image can be improved, even when a viewer is prevented from perceiving the merging of the right-eye and left-eye images. Further, the resolution of the display image deteriorates in the first unit period. However, since the scanning lines are selected at the interval of every other scanning line in the second unit period immediately subsequent to the first unit period and a gray scale potential is supplied to the pixels, it is difficult for the viewer to perceive the deterioration in the resolution in the display image.

The electro-optic device according to the aspect of the invention displays right-eye and left-eye images stereoscopically viewed with stereoscopic glasses including right-eye and left-eye shutters. The electro-optic device may further include a glasses control circuit that controls both the right-eye and left-eye shutters to cause the shutters to be in the closed state in a period (which includes at least a part of a first unit period of each display period and a part of second to fourth unit periods) including at least a part of the first unit period of each display period, controls the right-eye and left-eye shutters to be in the open state and the closed state, respectively, in a period (which includes at least a part of the second to fourth unit periods and a part of the first unit period) including at least a part of the second, third, and fourth unit periods of each display period of the right-eye image, and controls the left-eye and right-eye shutters to the open state and the closed state, respectively, in a period (which includes at least a part of the second to fourth unit periods and includes a part of the first unit period) including at least a part of the second, third, and fourth unit periods of each display period of the left-eye image.

In the electro-optic device according to the aspect of the invention, the signal line driving circuit may set a polarity of the gray scale potential with respect to a reference voltage to a first polarity in the first and second unit periods of each display period and set the polarity of the gray scale potential with respect to the reference voltage to a second polarity reverse to the first polarity in the third and fourth periods of each display period. With such a configuration, in one display period, the length of time in which the gray scale potential is set to the first polarity is equal to the length of time in which the gray scale potential is set to the second polarity. Accordingly, it is possible to obtain the advantage of suppressing a direct-current voltage from being applied to the pixels.

In the electro-optic device according to the aspect of the invention, in each control period including the display period of the right-eye image and the display period of the left-eye image which occur in tandem, the signal line driving circuit may reverse the polarities of the gray scale potentials of the first to fourth unit periods of the display periods to each other. With such a configuration, since the polarity of the gray scale potential in each unit period is reversed in each control period, it is possible to obtain the advantage of suppressing a direct-current voltage from being applied to the pixels.

In the electro-optic device according to the aspect of the invention, the signal line driving circuit may set the polarities of the gray scale potentials with respect to the reference voltage to a first polarity in the first and second unit periods of the front display period of one control period, set the polarities of the gray scale potentials to a second polarity which is reverse to the first polarity in the third and fourth unit periods of the front display period of one control period, set the polarities of the gray scale potentials to the first polarity in the latter period of first, second, third, and fourth unit periods of the latter display period of one control period, and set the polarities of the gray scale potentials to the second polarity in the front period of the third and fourth unit periods of the latter display period of one control period. With such a configuration, since the length of time in which the voltage with the same polarity continues to be applied to the pixels is shortened, it is possible to obtain the advantage of preventing flickering of the display image.

The electro-optic device according to the aspect of the invention may be utilized as a display member in various electronic apparatuses. For example, a stereoscopic display apparatus including the electro-optic device according to the aspect of the invention and stereoscopic glasses controlled by the glasses control circuit are exemplified as an electronic apparatus capable of performing aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
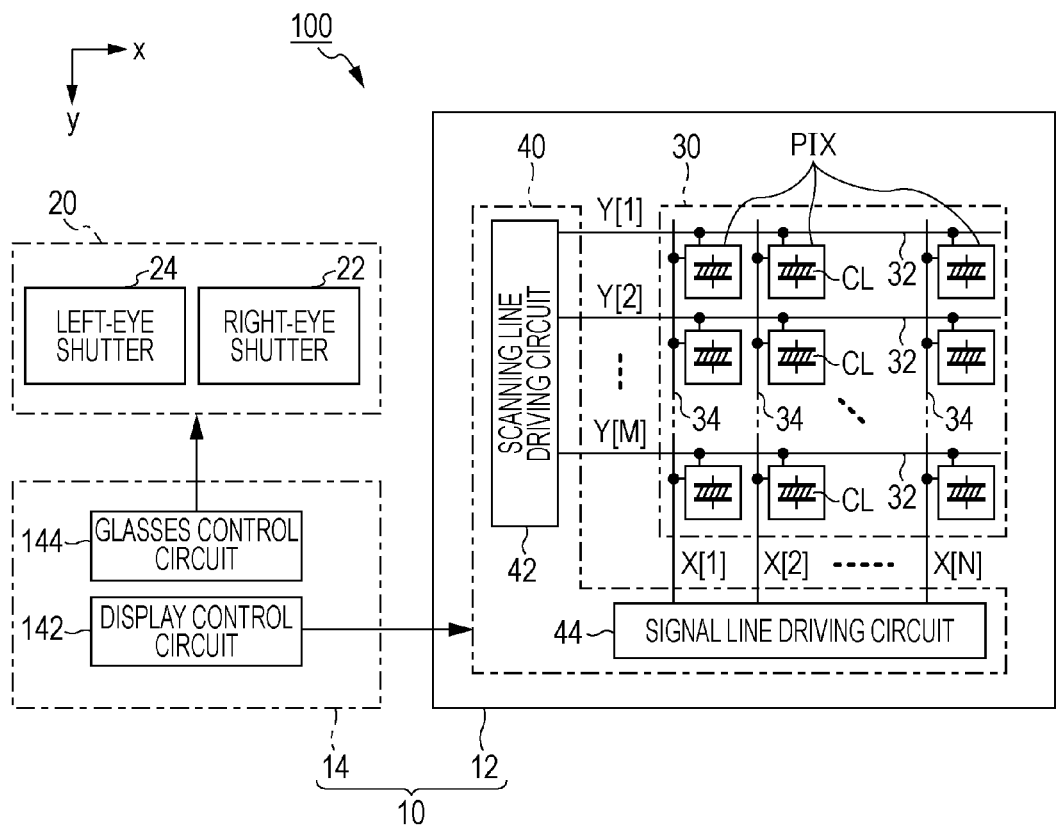
FIG. 1 is a block diagram illustrating a stereoscopic display apparatus according to a first embodiment of the invention.

FIG. 1 is a block diagram illustrating a stereoscopic display apparatus 100 according to a first embodiment of the invention. The stereoscopic display apparatus 100 is an electronic apparatus that displays a stereoscopic image, for which a viewer perceives a stereoscopic effect, in an active shutter mode. The stereoscopic display apparatus 100 includes an electro-optic device 10 and stereoscopic glasses 20. The electro-optic device 10 alternately displays a right-eye image GR and a left-eye image GL with a mutual parallax effect in a time-division manner.

The stereoscopic glasses 20 are a glasses-type instrument which a viewer wears when viewing a stereoscopic image displayed by the electro-optic device 10. The stereoscopic glasses 20 include a right-eye shutter 22 located on the front side of the right eye of the viewer and a left-eye shutter 24 located on the front side of the left eye of the viewer. The right-eye shutter 22 and the left-eye shutter 24 are each controlled so as to be in an open state (light-transmission state) where irradiated light is transmitted and a closed state (light-blocking state) where irradiated light is blocked. For example, a liquid crystal shutter changed from one of the open state and the closed state to the other thereof by changing the alignment direction of liquid crystal in accordance with an applied voltage can be utilized as the right-eye shutter 22 and the left-eye shutter 24.

The electro-optic device 10 in FIG. 1 includes an electro-optic panel 12 and a control circuit 14. The electro-optic panel 12 includes a pixel section 30 in which a plurality of pixels (pixel circuits) PIX are arranged and a driving circuit 40 for driving the pixels PIX. M scanning lines 32 extending in the x direction and N signal lines 34 extending in the y direction intersecting the x direction are formed in the pixel section 30 (where M and N are natural numbers). In the pixel section 30, the plurality of pixels PIX are arranged in a matrix form of vertical M rows by horizontal N columns so as to correspond to the intersections of the scanning lines 32 and the signal lines 34.

The driving circuit 40 includes a scanning line driving circuit 42 and a signal line driving circuit 44. The scanning line driving circuit 42 sequentially selects the scanning lines 32 when scanning signals Y[1] to Y[M] corresponding to the scanning lines 32, respectively, are supplied. When the scanning signals Y[m] (where m=1 to M) are set with a predetermined selection potential, an m-th scanning line 32 is selected. The signal line driving circuit 44 supplies gray scale potentials X[1] to X[N] to the N signal lines 34, respectively, in synchronization with the selection of the scanning lines 32 by the scanning line driving circuit 42. The gray scale potential X [n] (where n=1 to N) is set to be variable in accordance with the gray scale (hereinafter, referred to as a "designation gray scale") used for designating an image signal supplied from an outside circuit to each pixel PIX. The polarity of the gray scale potential X [n] with respect to a predetermined reference potential is reversed periodically.

Figure 2:
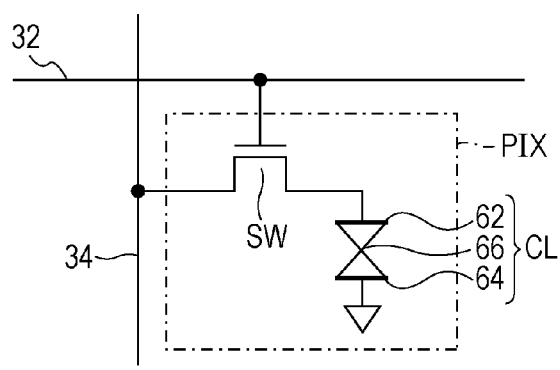
FIG. 2 is a circuit diagram illustrating a pixel circuit.

FIG. 2 is a circuit diagram illustrating each pixel PIX. As shown in FIG. 2, each pixel PIX includes a liquid crystal element CL and a select switch SW. The liquid crystal element CL is an electro-optic element that includes a pixel electrode 62, a common electrode 64 facing the pixel electrode 62, and liquid crystal 66 interposed between both electrodes. The transmittance (display gray scale) of the liquid crystal 66 is changed in accordance with a voltage applied between the pixel electrode 62 and the common electrode 64. The select switch SW is configured by an N-channel thin film transistor with a gate connected to the scanning line 32. The select switch SW is interposed between the liquid crystal element CL and the signal line 34 and controls electric connection (conduction/insulation) therebetween. When the scanning signal Y[m] is set to a select potential, the select switches SW in the pixels PIX of the m-th row are simultaneously transitioned to an ON state. When the select switch SW is controlled to the ON state (that is, when the scanning line 32 is selected), each pixel PIX (the liquid crystal element CL) displays the gray scale corresponding to the gray scale potential X [n] of the signal line 34. An auxiliary capacitor may be connected in parallel to the liquid crystal element CL.

The control circuit 14 in FIG. 1 includes a display control circuit 142 that controls the electro-optic panel 12 and a glasses control circuit 144 that controls the stereoscopic glasses 20. The display control circuit 142 and the glasses control circuit 144 may be mounted integrally on a single integrated circuit. Alternatively, the display control circuit 142 and the glasses control circuit 144 may be mounted separately on separate integrated circuits. The display control circuit 142 controls the driving circuit 40 such that the driving circuit 40 displays the right-eye image GR and the left-eye image GL having a mutual parallax effect in a time-division manner on the pixel section 30. Specifically, the display control circuit 142 controls the driving circuit 40 such that the driving circuit 40 performs a process described below.

Figure 3:
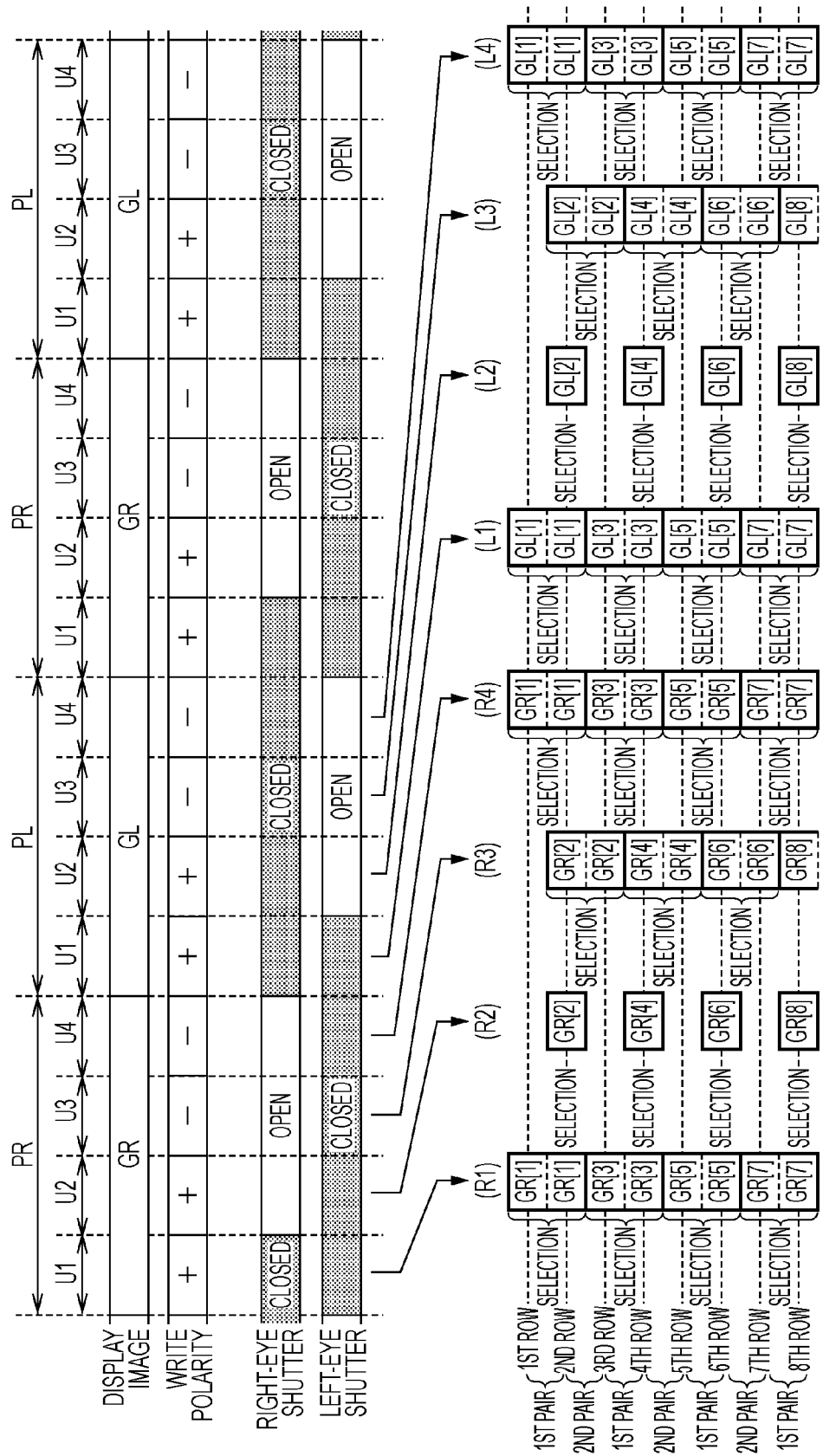
FIG. 3 is a diagram illustrating a process of the stereoscopic display apparatus.

FIG. 3 is a diagram illustrating the process of operating the electro-optic device 10. The electro-optic device 10 operates at an interval of a display period P (a right-eye display period PR and a left-eye display period PL) with a predetermined length. In the right-eye display period PR, the right-eye image GR is displayed on the pixel section 30. In the left-eye display period PL, the left-eye image GL is displayed on the display section 30. The right-eye display period PR and the left-eye display period PL are arranged on a time axis. Each of the display periods P (PR and PL) is divided into four unit periods (U1 to U4). The unit period U2 is subsequent to the unit period U1, the unit period U3 is subsequent to the unit period U2, and the unit period U4 is subsequent to the unit period U3.

Figure 4:
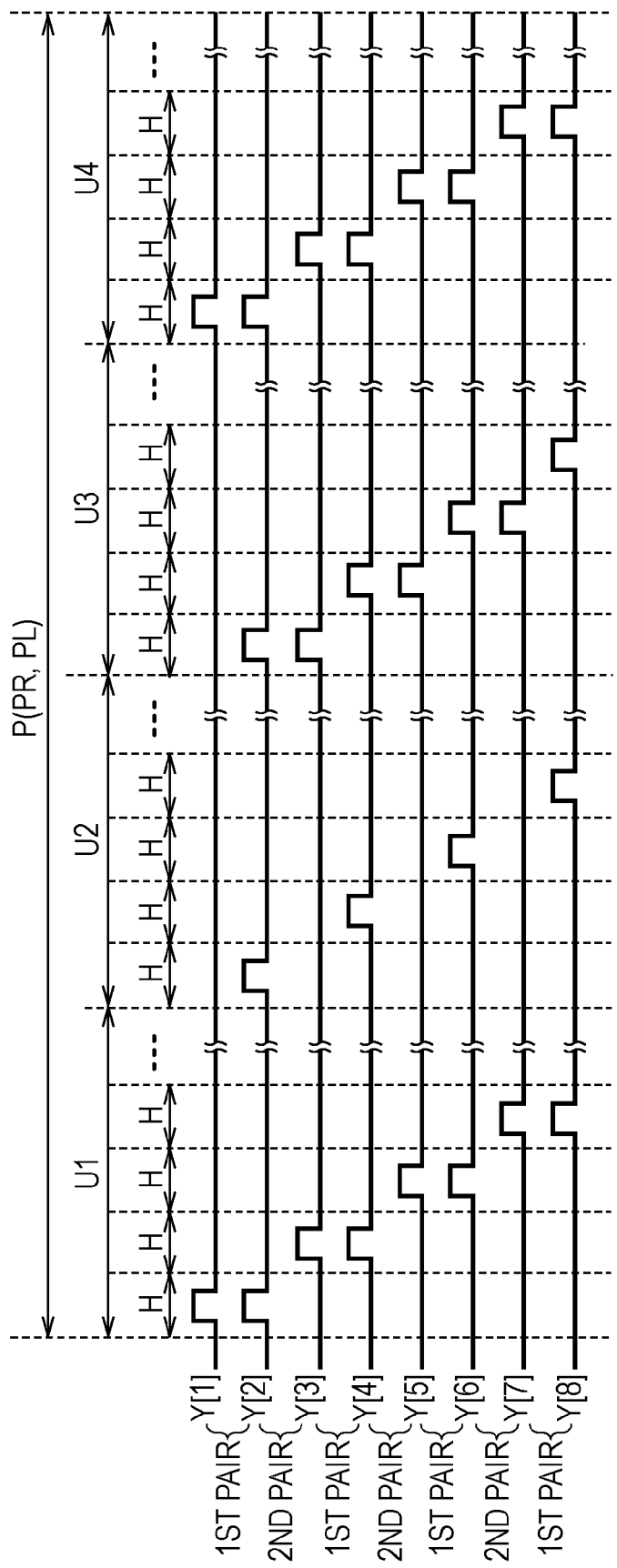
FIG. 4 is a diagram illustrating a process of a scanning line driving circuit.

FIG. 4 is a diagram illustrating a process of the scanning line driving circuit 42 in the display periods P (PR and PL). In the unit period U1 of each display period P, as shown in FIG. 4, the scanning line driving circuit 42 sequentially selects each of plurality of pairs (hereinafter, referred to as "first pairs") of scanning lines, which are two adjacent scanning lines divided from the M scanning lines 32, in each selection period H. The first pair of scanning lines includes one scanning line 32 of an even row (2k-th row) and one scanning line 32 of an odd row ((2k−1)-th row) adjacent to the one scanning line 32 on the negative side of the Y direction. The scanning line driving circuit 42 simultaneously selects the first pair of two scanning lines 32 by setting the scanning signals Y[2k−1] and Y[2k] so as to have a selection potential in one selection period H of the unit period U1. For example, the scanning line driving circuit 42 simultaneously selects two scanning lines 32 of the first and second rows in the first selection period H of the unit period U1, and then simultaneously selects two scanning lines 32 of the third and fourth rows in the second selection period H of the unit period U1.

In the unit period U2 of each display period P, the scanning line driving circuit 42 sequentially selects the M scanning lines 32 at every other interval in each selection period H. That is, one scanning line 32 of each of the first pairs of two scanning lines 32 is sequentially selected in the unit period U2. Specifically, the scanning line driving circuit 42 sequentially selects the scanning lines 32 of the even row in each selection period H by setting the scanning signal Y[2k] to a selection potential in one selection period H of the unit period U2. For example, the scanning line driving circuit 42 selects the scanning line 32 of the second row in the first selection period H of the unit period U2 and selects the scanning line 32 of the fourth row in the second selection period H of the unit period U2. The scanning lines 32 of the odd rows are not selected in the unit period U2.

In the unit period U3 of each display period P, the scanning line driving circuit 42 sequentially selects each of plurality of pairs (hereinafter, referred to as "second pairs") of scanning lines, which are two adjacent scanning lines divided from the M scanning lines 32 in a combination different from the first pair of scanning lines, in each selection period H. The second pair of scanning lines includes one scanning line 32 of an even row (2k-th row) and one scanning line 32 of an odd row ((2k+1)-th row) adjacent to the one scanning line 32 on the positive side of the Y direction. That is, the first and second pairs of scanning lines have a relation in which the first pair of scanning lines is shifted by one scanning line in the Y direction from the second pair of scanning lines 32. The scanning line driving circuit 42 simultaneously selects the second pair of two scanning lines 32 by setting the scanning signals Y[2k] and Y[2k+1] so as to have a selection potential in one selection period H of the unit period U3. For example, the scanning line driving circuit 42 simultaneously selects two scanning lines 32 of the second and third rows in the first selection period H of the unit period U3, and then simultaneously selects two scanning lines 32 of the fourth and fifth rows in the second selection period H of the unit period U3. Further, to facilitate the description of the first embodiment, the case has hitherto been described in which the scanning lines 32 of the first and M-th rows are not selected in the unit period U3. However, the scanning lines 32 of the first and M-th rows may be also selected in the unit period U3.

In the unit period U4 of each display period P, the scanning line driving circuit 42 sequentially selects the first pair of scanning lines, which are two scanning lines 32 of the (2k−1)-th and 2k-th rows, in each selection period H, as in the unit period U1. For example, the scanning line driving circuit 42 simultaneously selects two scanning lines 32 of the first and second rows in the first selection period H of the unit period U4, and then simultaneously selects two scanning lines 32 of the third and fourth rows in the second selection period H of the unit period U4.

As shown in FIG. 3, the signal line driving circuit 44 sequentially supplies the signal lines 34 with the gray scale potentials X[1] to X[N] corresponding to the image signal of the right-eye image GR in the selection periods H of the right-eye display period PR, respectively, and sequentially supplies the signal lines 34 with the gray scale potentials X[1] to X[N] corresponding to the image signal of the left-eye image GL in the selection periods H of the left-eye display period PL, respectively. FIG. 3 shows a temporal variation in the polarity (write polarity) of each gray scale potential X [n]

with respect to a predetermined reference potential (for example, the potential of the common electrode 64).

Since the gray scale potential X [n] is supplied to the pixel electrode 62 of the liquid crystal element CL, the polarities exemplified in FIG. 3 can be identical with the polarities of the voltage applied to the liquid crystal element CL. As shown in FIG. 3, the signal line driving circuit 44 sets the polarity (the polarity of the voltage applied to the liquid crystal element CL) of the gray scale potential X [n] to be reversed between a pair of unit periods U1 and U2 and a pair of unit periods U3 and U4 in each period P (PR and PL). Specifically, the gray scale X [n] is set to have a positive polarity (+) in the unit periods U1 and U2 of each display period P and is set to have a negative polarity (−) in the unit periods U3 and U4 of each display period P.

A process of the signal line driving circuit 44 in the periods (U1 to U4) of each display period P (hereinafter, particularly, the right-eye display period PR) will be described in detail. In the selection period H in which two scanning lines 32 of the (2k−1)-th and 2k-th rows forming the first pair of scanning lines are selected in the unit period U1 of the right-eye display period PR, the signal line driving circuit 44 supplies each signal line 34 with the gray scale potential X [n] corresponding to a designated gray scale GR [2k−1] of the pixels PIX of the (2k−1)-th row in the right-eye image GR. Accordingly, as shown in a portion (R1) of FIG. 3, the gray scale potential X [n] corresponding to the designated gray scale GR [2k−1] of the pixels PIX of the (2k−1)-th row is commonly supplied to the pixels PIX of the (2k−1)-th and 2k-th rows. For example, in the first selection period H of the unit period U1, the gray scale potential X [n] corresponding to the designated gray scale GR [1] of the pixels PIX of the first row in the right-eye image GR is supplied to the pixels PIX of the first and second rows. In the second selection period H, the gray scale potential X [n] corresponding to the designated gray scale GR [3] of the pixels PIX of the third row in the right-eye image GR is supplied to the pixels PIX of the third and fourth rows. In this way, the common gray scale potential X [n] is supplied to two pixels PIX adjacent to each other in the Y direction in the unit period U1. Therefore, when the unit period U1 of the right-eye display period PR ends, the right-eye image GR of which the resolution in the Y direction is halved is displayed on the pixel section 30.

In the unit period U2 of the right-eye display period PR, the signal line driving circuit 44 supplies each signal line 34 with the gray scale potential X [n] corresponding to a designated gray scale GR [2k] of the pixels PIX in the 2k-th scanning line 32 in the right-eye image GR in the selection period H in which the scanning line 32 of the 2k-th row is selected. For example, as shown in a portion (R2) of FIG. 3, in the first selection period H of the unit period U2, the gray scale potential X [n] corresponding to the designated gray scale GR [2] of the pixels PIX of the second row in the right-eye image GR is supplied to the pixels PIX of the second row. In the second selection period H, the gray scale potential X [n] corresponding to the designated gray scale GR [4] of the pixels PIX of the fourth row in the right-eye image GR is supplied to the pixels PIX of the fourth row. On the other hand, the voltage applied to the liquid crystal element CL in the pixels PIX of the odd rows is maintained as the voltage set in the immediately previous unit period U1. Accordingly, the right-eye image GR displayed with the half resolution in the Y direction at the end point of the unit period U1 is updated to the right-eye image GR with a desired resolution (vertical M rows by horizontal N columns) at the end point of the unit period U2.

In the unit period U3 of the right-eye display period PR, the signal line driving circuit 44 supplies each signal line 34 with the gray scale potential X [n] corresponding to the designated gray scale GR [2k] of the pixels PIX of the 2k-th row in the right-eye image GR in the selection period H in which two scanning lines 32 of the 2k-th and (2k+1)-th rows forming the second pair of scanning lines are selected. Accordingly, as shown in a portion (R3) of FIG. 3, the gray scale potential X [n] corresponding to the designated gray scale GR [2k] of the pixels PIX of the 2k-th row is commonly supplied to the pixels PIX of the 2k-th and (2k+1)-th rows forming the second pair of scanning lines. For example, in the first selection period H of the unit period U3, the gray scale potential X [n] corresponding to the designated gray scale GR [2] of the pixels PIX of the second row in the right-eye image GR is supplied to the pixels PIX of the second and third rows. In the second selection period H, the gray scale potential X [n] corresponding to the designated gray scale GR [4] of the pixels PIX of the fourth row in the right-eye image GR is supplied to the pixels PIX of the fourth and fifth rows. Further, in the configuration in which the scanning lines of the first and M-th rows are selected in the unit period U3, for example, the gray scale potential X [n] which is a predetermined potential (for example, a potential corresponding to the intermediate level) is supplied to the signal lines 34 in the selection period H in which the scanning lines of the first and M-th rows are selected.

In the unit period U4 of the right-eye display period PR, the signal line driving circuit 44 operates as in the unit period U1. That is, as shown in a portion (R4) of FIG. 3, in the selection period H in which two scanning lines 32 of the (2k−1)-th and 2k-th rows forming the first pair of scanning lines in the unit period U4, the gray scale potential X [n] corresponding to the designated gray scale GR [2k−1] of the pixels PIX of the (2k−1)-th row in the right-eye image GR is supplied to the signal lines 34. For example, the gray scale potential X [n] corresponding to the designated gray scale GR [1] of the first row is supplied to the pixels PIX of the first and second rows. The gray scale potential X [n] corresponding to the designated gray scale GR [3] of the pixels of the third row is supplied to the pixels PIX of the third and fourth rows.

The example has hitherto been described in which the process is performed within the right-eye display period PR. However, the signal line driving circuit 44 may perform the same process even in the left-eye display period PL. That is, in each selection period H of the unit period U1 of the left-eye display period PL, as shown in a portion (L1) of FIG. 3, the gray scale potential X [n] corresponding to a designated gray scale GL [2k−1] of the pixels PIX of the (2k−1)-th row is supplied to the pixels PIX of the first pair of scanning lines formed by the (2k−1)-th and 2k-th rows. Further, in each selection period H of the unit period U2, as shown in a portion (L2) of FIG. 3, the gray scale potential X [n] corresponding to a designated gray scale GL [2k] of the pixels PIX is supplied to the pixels PIX of the 2k-th row. Furthermore, in each selection period H of the unit period U3, as shown in a portion (L3) of FIG. 3, the gray scale potential X [n] corresponding to the designated gray scale GL [2k] of the 2k-th row is supplied to the pixels PIX of the second pair of scanning lines formed by the 2k-th and (2k+1)-th scanning lines. In each selection period H of the unit period U4, as shown in a portion (L4) of FIG. 3, the gray scale potential X [n] corresponding to the designated gray scale GL [2k−1] of the (2k−1)-th row is supplied to the pixels PIX of the first pair of scanning lines formed by the (2k−1) and 2k-th scanning lines, as in the unit period U1.

As understood from the above description, in the unit period U1 of the right-eye display period PR, the left-eye image GL displayed in the immediately previous left-eye display period PL (the unit period U4) is updated to the right-eye image GR in order in each first pair of scanning lines (every two lines). In the unit period U1 of the left-eye display period PL, the right-eye image GR displayed in the immediately previous right-eye display period PR (the unit period U4) is updated to the left-eye display image GL in order in each first pair of scanning lines. That is, in the unit period U1 of each display period P, the right-eye image GR and the left-eye image GL are merged.

The glasses control circuit 144 of the control circuit 14 in FIG. 1 controls the states (the open state and the closed state) of the right-eye shutter 22 and the left-eye shutter 24 of the stereoscopic glasses 20 in synchronization with the process of the electro-optic panel 12. Specifically, the glasses control circuit 144 controls both the right-eye shutter 22 and the left-eye shutter 24 to the closed state in the unit period U1 of each display period P (PR and PL), as shown in FIG. 3. Further, the glasses control circuit 144 controls the right-eye shutter 22 and the left-eye shutter 24 to the open state and the closed state, respectively, in the unit periods U2, U3, and U4 of the right-eye display period PR and controls the left-eye shutter 24 and the right-eye shutter 22 to the open state and the closed state, respectively, in the unit periods U2, U3, and U4 of the left-eye display period PL.

Accordingly, the right-eye image GR displayed in the unit periods U2, U3, and U4 of the right-eye display period PR is transmitted through the right-eye shutter 22 and reaches the right eye of a viewer, and the right-eye image GR is blocked by the left-eye shutter 24. On the other hand, the left-eye image GL displayed in the unit periods U2, U3, and U4 of the left-eye display period PL is transmitted through the left-eye shutter 24 and reaches the left eye of the viewer, while the left-eye image GL is blocked by the right-eye shutter 22. Thus, the viewer can perceive the stereoscopic effect of the display image, since the viewer views the right-eye image GR transmitted through the right-eye shutter 22 with his or her right eye and views the left-eye image GL transmitted through the left-eye shutter 24 with his or her left eye.

As described above, the right-eye image GR and the left-eye image GL are merged in the unit period U1 of each display period P. As described above with reference to FIG. 3, however, both the right-eye shutter 22 and the left-eye shutter 24 are in the closed state in the unit period U1 of each display period P. Therefore, the merging (crosstalk) of the right-eye image GR and the left-eye image GL is not perceived by the viewer. That is, since the right-eye image GR and the left-eye image GL are reliably separated to the right and left eyes, respectively, the viewer can perceive a clear stereoscopic effect.

In the above-described first embodiment, the scanning lines 32 are selected in the unit of two lines in the unit period U1 and the gray scale potentials X [n] are supplied to the pixels PIX. Accordingly, the length of time of the merging period (that is, a period in which both the right-eye shutter 22 and the left-eye shutter 24 are retained in the closed state) of the right-eye image GR and the left-eye image GL is shortened, compared to a configuration in which the scanning lines 32 are selected in the unit of one line in order in each selection period H of each display period P and the gray scale potentials X [n] are supplied to the pixels PIX. That is, the length of time can be sufficiently ensured to retain the open state of the right-eye shutter 22 or the left-eye shutter 24 during the display period P. Accordingly, it is possible to improve the brightness of the display image which the viewer perceives. The resolution of the display image in the Y direction in the unit period U1 of each display period P deteriorates, but the gray scale potential X [n] is supplied to the pixels PIX of the 2k-th row in the immediately subsequent unit period U2. Therefore, it is difficult for the viewer to perceive the deterioration in the resolution of the display image in the unit period U1.

Since the pixels PIX are selected in the interval of two lines in the unit periods U3 and U4, as in the unit period U1, the resolution of the display image actually deteriorates in the unit periods U3 and U4. However, the second pair of scanning lines selected in the unit period U3 is shifted by one scanning line in the Y direction from the first pair of scanning lines selected in the unit period U4. Further, the gray scale potential X [n] (the potential corresponding to the designated gray scale of the 2k-th row) supplied to the pixels PIX of the second pair of scanning lines in the unit period U3 is different from the gray scale potential X [n] (the potential corresponding to the designated gray scale of the (2k−1)-th row) supplied to the pixels PIX of the first pair of scanning lines in the unit period U4. Therefore, it is possible to obtain the advantage that it is difficult for the viewer to perceive the deterioration in the resolution of the display image in the unit periods U3 and U4.

A configuration (hereinafter, referred to as a "configuration A") in which the polarity of the gray scale potential X [n] is reversed between the right-eye display period PR and the left-eye display period PL can be assumed as the configuration in which the polarity of the gray scale potential X [n] is reversed. However, since the right-eye image GR and the left-eye image GL are normally different from each other, the voltage applied to the liquid crystal element CL is different between the right-eye display period PR and the left-eye display period PL. As a result, a problem may arise in that a bias (residual of a direct-current component) to the polarity of the voltage applied to the liquid crystal element CL occurs. In the first embodiment, the polarity of the gray scale potential X [n] is set to the positive polarity (+) in the unit periods U1 and U2 of each display period P and the polarity of the gray scale potential X [n] is set to the negative polarity (−) in the unit periods U3 and U4 of each display period P. That is, the length of time in which the gray scale potential X [n] is set to be positive in the right-eye display period PR is equal to the length of time in which the gray scale potential X [n] is set to be negative in the right-eye display period PR. Further, the length of time in which the gray scale potential X [n] is set to be positive in the left-eye display period PL is equal to the length of time in which the gray scale potential X [n] is set to be negative in the left-eye display period PL. Accordingly, it is possible to obtain the advantage of reducing the application of the direct-current component to the liquid crystal element CL, compared to the configuration A. Further, since the reversing period of the polarity of the gray scale potential X [n] is shortened compared to the configuration A, it is possible to obtain the advantage of efficiently reducing flickering of the display image. However, the configuration A is also included in the scope of the invention.

Second Embodiment

A second embodiment of the invention will be described. In the embodiment exemplified below, the same reference numerals are given to the same elements as those of the first embodiment in terms of the operation or the function and the detailed description thereof will not be appropriately repeated.

Figure 5:
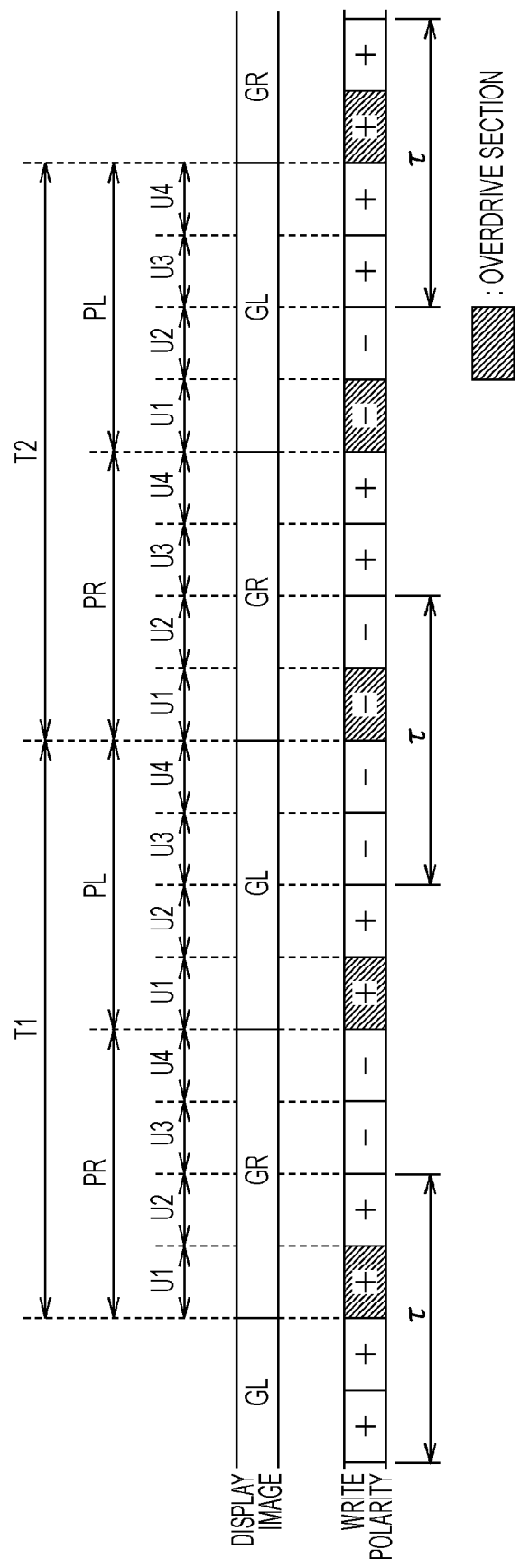
FIG. 5 is a diagram illustrating a process of the stereoscopic display apparatus according to a second embodiment.

FIG. 5 is a diagram illustrating a process according to the second embodiment. In a unit period U1 of each display period P, a display image is updated from one of a right-eye image GR and a left-eye image GL to the other thereof.

Therefore, it is necessary to considerably change the alignment state of liquid crystal 66 of a liquid crystal element CL, compared to unit periods U2 to U4. Accordingly, response delay of the liquid crystal 66 may be caused in the unit period U1 more easily than in the other unit periods U2 to U4. Accordingly, in order to reduce the response delay of the liquid crystal 66, as shown in FIG. 5, a signal line driving circuit 44 according to the second embodiment performs overdrive (overvoltage driving) in which an overvoltage higher than a target voltage corresponding to a designated gray scale is applied to the liquid crystal element CL of the pixels PIX in the unit period U1 of each display period P (PR and PL).

In the first embodiment, the gray scale potential X [n] is set to be positive in the unit periods U1 and U2 of each display period P and the gray scale potential X [n] is set to be negative in the unit periods U3 and U4. However, when the overdrive is performed in the unit period U1 of each display period P, the voltage with the positive polarity applied to the liquid crystal element CL in the unit periods U1 and U2 may not be equal to the voltage with the negative polarity applied to the liquid crystal element CL in the unit periods U3 and U4. As a result, there is a concern that the direct-current component may be applied to the liquid crystal element CL.

In order to resolve this problem, the signal line driving circuit 44 according to the second embodiment reverses the polarity of the gray scale potential X [n] in each unit period U (U1 to U4) of each control period T configured by two display periods P (a pair of right-eye display period PR and a left-eye display period PL) which occur in tandem.

FIG. 5 shows one arbitrary control period T1 and a control period T2 immediately subsequent thereto. In each display period P (PR and PL) of the control period T1, as shown in FIG. 5, the gray scale potential X [n] is set to be positive in the unit periods U1 and U2 and is set to be negative in the unit periods U3 and U4, as in the first embodiment. On the other hand, in each display period P (PL and PL) of the control period T2, the gray scale potential X [n] is set to be negative in the unit periods U1 and U2 and the gray scale potential X [n] is set to be positive in the unit periods U3 and U4, contrary to each unit period U of the control period T1.

In the second embodiment, it is possible to obtain the same advantages as those of the first embodiment. In the second embodiment, the polarity of the gray scale potential X [n] is reversed in each control period T in each unit period U (U1 to U4). Therefore, when attention is paid to the right-eye display period PR of the control period T1 and the right-eye display period PR of the control period T2, the length of time in which the voltage with the positive polarity is applied to the liquid crystal element CL in the unit period U1 is equal to the length of time in which the voltage with the negative polarity is applied to the liquid crystal element CL in the unit period U1. Accordingly, even when the overdrive is performed in the unit period U1 of each display period P, it is possible to obtain the advantage of efficiently preventing the direct-current component from being applied to the liquid crystal element CL. Further, since the cause of the bias to the polarity of the voltage applied to the liquid crystal element CL is not restricted to the overdrive, the second embodiment is effectively utilized even in a configuration in which no overdrive is performed.

Third Embodiment

When the polarity of the gray scale potential X [n] in each unit period U is reversed in each control period T, as in the second embodiment, a period occurs in which the same polarity of the voltage applied to the liquid crystal element L continues to be retained across a length of time T corresponding to four unit periods U, as shown in FIG. 5. However, a problem may arise in that it is easy for a viewer to perceive a temporal variation (that is, flickering) in the display gray scale caused due to the difference in the polarity of the applied voltage, as a period in which the voltage with the same polarity is applied to the liquid crystal element CL is longer. In a third embodiment, a solution to this problem occurring in the second embodiment will be described.

Figure 6:
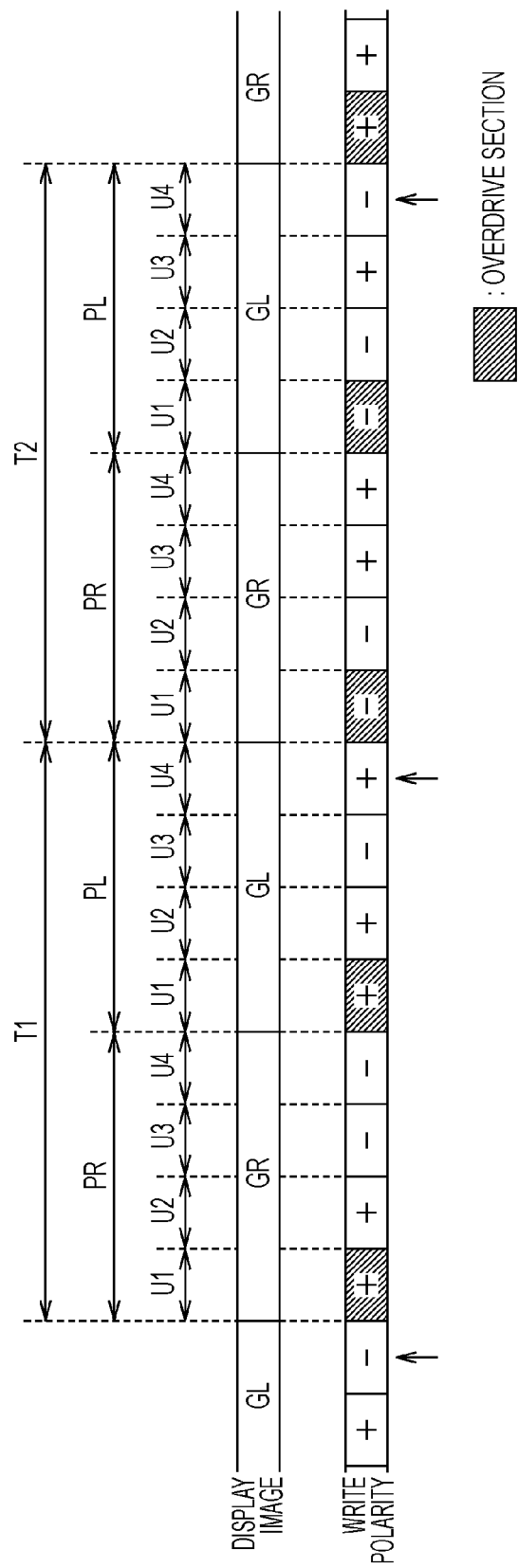
FIG. 6 is a diagram illustrating a process of the stereoscopic display apparatus according to a third embodiment.

FIG. 6 is a diagram illustrating a process according to the third embodiment. In the third embodiment, as emphasized by the arrows in FIG. 6, the gray scale potential X [n] in the final unit period U4 of each control period T (T1 and T2) is set to have a polarity reverse to the polarity of the second embodiment.

Specifically, in the front display period P (in the example of FIG. 6, the right-eye display period PR) of the control period T1, the signal line driving circuit 44 sets the gray scale potential X [n] to have the positive polarity in the unit periods U1 and U2 and sets the gray scale potential X [n] to have the negative polarity in the unit periods U3 and U4, as in the second embodiment. On the other hand, in the latter display period P (in the example of FIG. 6, the left-eye display period PL) of the control period T1, the signal line driving circuit 44 sets the gray scale potential X [n] to have the same polarities as the polarities (the positive polarity→the positive polarity→the negative polarity) of each unit period U of the immediately previous display period P from the unit period U1 to the unit period U3. However, in the final unit period U4 of the control period T1, the signal line driving circuit 44 sets the gray scale potential X [n] to have the positive polarity reverse to the polarity of the unit period U4 of the immediately previous display period P. The polarities of the gray scale potential X [n] in the unit periods U (U1 to U4) of the control period T2 are reverse to those of the control period T1, as in the second embodiment. In other words, the polarity of the gray scale potential X [n] in the final unit period U4 of the control period T1 can be said to be reverse to the polarity of the gray scale potential X [n] in the first unit period U1 of the immediately subsequent control period T2.

Even in the third embodiment, it is possible to obtain the same advantages as those of the first embodiment. In the third embodiment, the polarities of the gray scale potential X [n] in the unit periods U are set to be regular, as described above. Therefore, as understood from FIG. 6, the time in which the voltage applied to the liquid crystal element CL continues to be retained with the same polarity is only two unit periods U at maximum. Accordingly, it is advantageous in that it is difficult for the viewer to perceive the flickering caused due to a difference in the polarity of the applied voltage, compared to the second embodiment in which the applied voltage is retained with the same polarity across the length of time τ corresponding to four unit periods U.

MODIFIED EXAMPLES

Each embodiment described above may be modified in various forms. Specific modified examples will be described below. Two or more modified examples arbitrarily selected from the modified examples described below may be appropriately combined with consistency within the scope of the invention.

Figure 7:
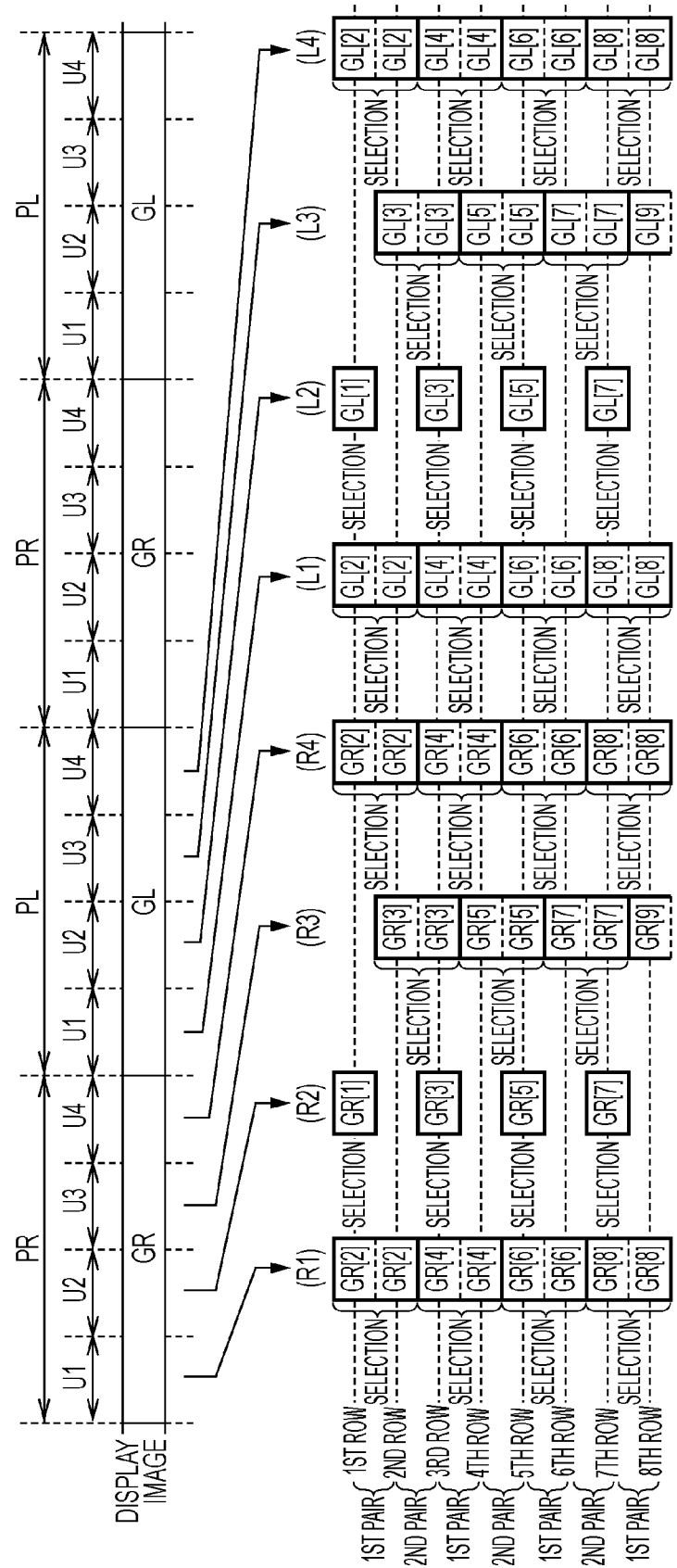
FIG. 7 is a diagram illustrating a process according to a modified example.

(1) In each embodiment described above, the gray scale potential X [n] is supplied to the pixels PIX of an even row in the unit period U2 of each display period P. As shown in FIG. 7, however, the gray scale potential X [n] may be supplied to the pixels PIX of an odd row ((2k−1)-th row) in the unit period U2 of each display period P. Specifically, the scanning line driving circuit 42 sequentially selects the scanning lines 32 of an odd row in each selection period H of the unit period U2. The signal line driving circuit 44 supplies each signal line 34 with the gray scale potential X [n] corresponding to the designated gray scale (GR [2k−1] and GL [2k−1]) of the pixels PIX of this odd row. In the unit period U1 immediately previous to the unit period U2, as shown in FIG. 7, the first pairs of scanning lines 32 are sequentially selected and the gray scale potential X [n] corresponding to the designated gray scale of the pixels PIX of the even row is supplied to each signal line 34.

Here, one scanning line 32 selected in the unit period U2 is referred to as a first scanning line 32A and the other scanning line 32 is referred to as a second scanning line 32B. The first scanning line 32A and the second scanning 32B are alternately arranged in the Y direction. In each embodiment described above, the scanning line 32 of an even row corresponds to the first scanning line 32A. In the configuration of FIG. 7, the scanning line 32 of an odd row corresponds to the first scanning line 32A. As understood from the example described above, the process of the signal line driving circuit 44 in the unit periods U1 and U2 of each display period P is included as a process of supplying each signal line 34 with the gray scale potential X [n] corresponding to the designated gray scale of the pixels PIX of the second scanning line 32B of the first pair of scanning lines selected in the corresponding selection period H in each selection period H of the unit period U1 and supplying each signal line 34 with the gray scale potential X [n] corresponding to the designated gray scale of the pixels PIX of the first scanning line 32A selected in the corresponding selection period H in each selection period H of the unit period U2.

Figure 8:
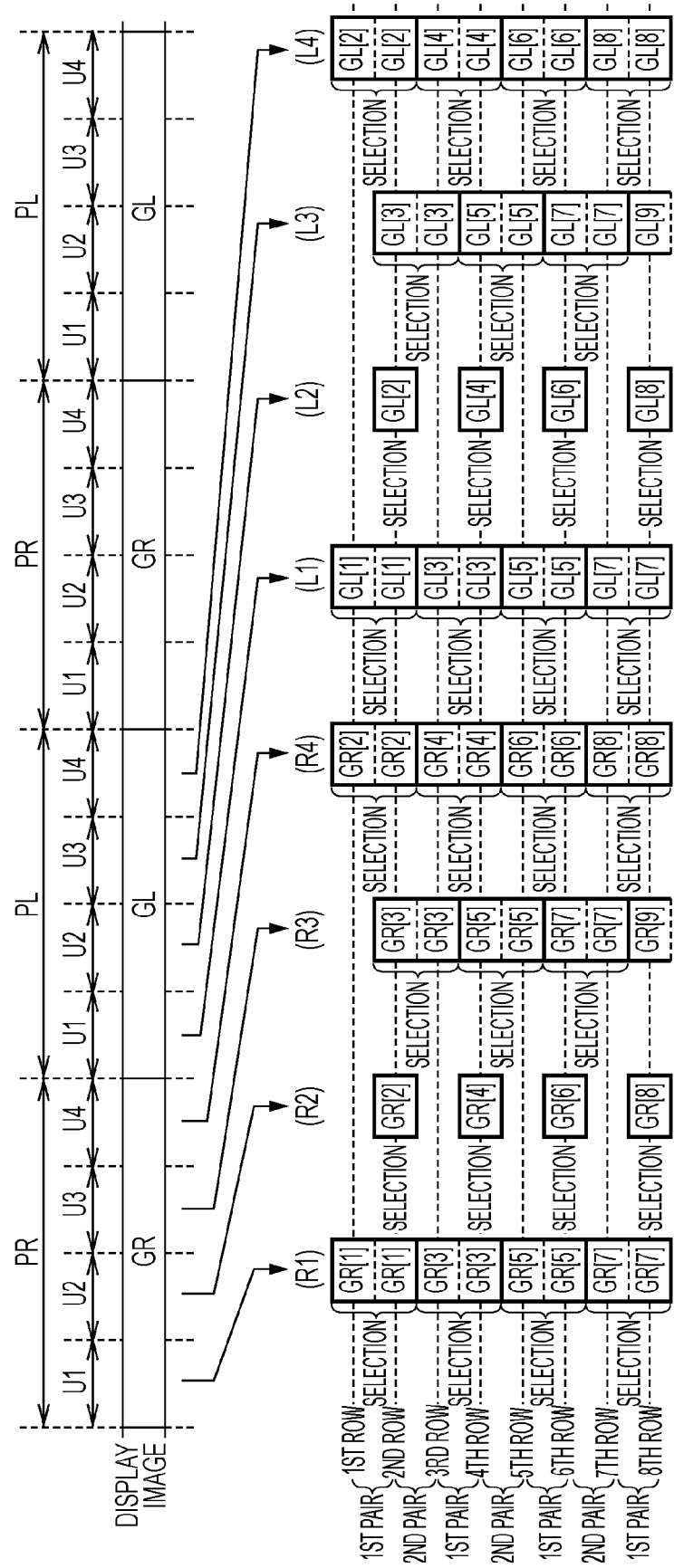
FIG. 8 is a diagram illustrating a process according to a modified example.

(2) In each embodiment described above, the process of the signal line driving circuit 44 is the same between the unit period U4 and the unit period U1. However, the process of the signal line driving circuit 44 may be different between the unit period U4 and the unit period U1. For example, as shown in FIG. 8, in the unit period U1 of each display period P, the gray scale potential X [n] corresponding to the designated gray scale of the pixels PIX of the scanning line 32 of an odd row of the first pair of scanning lines selected in the selection period H is supplied to each signal line 34, as in the first embodiment. In the unit period U4 of each display period P, the gray scale potential X [n] corresponding to the designated gray scale of the pixels PIX of the scanning line 32 of an even row of the first pair of scanning lines selected in the selection period H is supplied to each signal line 34. In the unit period U3 immediately previous to the unit period U4, the gray scale potential X [n] corresponding to the designated gay scale of the pixels PIX of the scanning line 32 of an odd row of the second pair of scanning lines selected in the selection period H is supplied to each signal line 34.

As understood from this example, when the scanning lines 32 are divided into the first scanning line 32A and the second scanning line 32B, as described above, the process of the signal line driving circuit 44 in the unit periods U3 and U4 of each display period P is included as a process of supplying each signal line 34 with the gray scale potential X [n] corresponding to the designated gray scale of the pixels PIX of one of the first scanning line 32A and the second scanning line 32B in the second pair of scanning lines selected in the corresponding selection period H in each selection period H of the unit period U3 and supplying each signal line 34 with the gray scale potential X [n] corresponding to the designated gray scale of the pixels PIX of the other of the first scanning line 32A and the second scanning line 32B in the first pair of scanning lines selected in the corresponding selection period H in each selection period H of the unit period U4. The expression "one of the first scanning line 32A and the second scanning line 32B" corresponds to the scanning line 32 of an even row in the first to third embodiments and corresponds to the scanning line 32 of an odd row in the configuration shown in FIG. 8. Further, the expression "the other of the first scanning line 32A and the second scanning line 32B" corresponds to the scanning line 32 of an odd row in the first to third embodiments and corresponds to the scanning line 32 of an even row in the configuration shown in FIG. 8.

(3) In each embodiment described above, the example has been described in which the unit period U4 is subsequent to the unit period U3. However, the unit period U4 may be previous to the unit period U3. That is, the unit period U4 in which the gray scale potential X [n] is supplied to the pixels PIX of the first pair of scanning lines may be previous to the unit period U3 in which the gray scale potential X [n] is supplied to the pixels PIX of the second pair of scanning lines. As understood from the above description, the unit periods U3 and U4 may be included as a period subsequent to the unit period U2 and the arrangement order of the unit periods U3 and U4 may be arbitrarily determined.

(4) In each embodiment described above, the right-eye shutter 22 is changed from the closed state to the open state at the end point of the unit period U1 in the right-eye display period PR. However, the right-eye shutter 22 may be changed from the closed state to the open state appropriately at any time. For example, in the configuration in which the right-eye shutter 22 is changed to the open state before the end point of the unit period U1 of the right-eye display period PR, the viewer only slightly perceives the merging of the right-eye image GR and the left-eye image GL in the unit period U1. However, it is possible to improve the brightness of the display image. On the contrary, in the configuration in which the right-eye shutter 22 is changed to the open state at the time point after the end point of the unit period U1 of the right-eye display period PR, the brightness of the display image deteriorates. However, it is possible to reliably prevent the viewer from perceiving the merging of the right-eye image GR and the left-eye image GL. Likewise, the time at which the right-eye shutter 22 is changed from the open state to the closed state may be set before the end point of the unit period U4 of the right-eye display period PR (the brightness of the display image deteriorates, but the merging of the right-eye image GR and the left-eye image GL is prevented). Alternatively, the time in which the right-eye shutter 22 is changed from the open state to the closed state may be set after the end point of the unit period U4 of the right-eye display period PR (the merging of the right-eye image GR and the left-eye image GL is slightly perceived in the unit period U1 of the left-eye display period PL, but the brightness of the display image is improved). The open and closed times in which it is difficult for the viewer to perceive the merging of the right-eye image GR and the left-eye image GL also depend on the relation between the response characteristics of the right-eye shutter 22 and the left-eye shutter 24 and the response characteristics of the electro-optic panel 12 (the liquid crystal panel CL). Accordingly, the time in which the right-eye shutter 22 is changed from the closed state to the open state or the time in which the right-eye shutter 22 is controlled from the open state to the closed state is selected in consideration of a priority (balance) between the factor in which the viewer is prevented from perceiving the merging of the right-eye image GR and the left-eye image GL and the factor by which the brightness of the display image is ensured or various factors such as the relation between the response characteristics of the stereoscopic glasses 20 and the response characteristics of the electro-optic panel 12. The right-eye shutter 22 has hitherto been described, but the same is applied to the left-eye shutter 24.

As understood from the above description, the period in which the right-eye shutter 22 is controlled to the open state is included as a period (irrespective of whether the unit period U1 is included) including at least a part of the unit periods U2, U3, and U4 of the right-eye display period PR. Likewise, the period in which the left-eye shutter 24 is controlled to the open state is included as a period (irrespective of whether the unit period U1 is included) including at least a part of the unit periods U2, U3, and U4 of the left-eye display period PL. Further, the time in which both the right-eye shutter 22 and the left-eye shutter 24 are controlled to the closed state is included as a period of a part of the unit period U1 of each display period P (PR and PL).

(5) The electro-optic element is not limited to the liquid crystal element CL. For example, an electrophoretic element may be used as the electro-optic element. That is, the electro-optic element is included as a display element in which optical characteristics (for example, a transmittance) varies depending on an electric operation (for example, application of a voltage).

APPLICATION EXAMPLES

Figure 9:
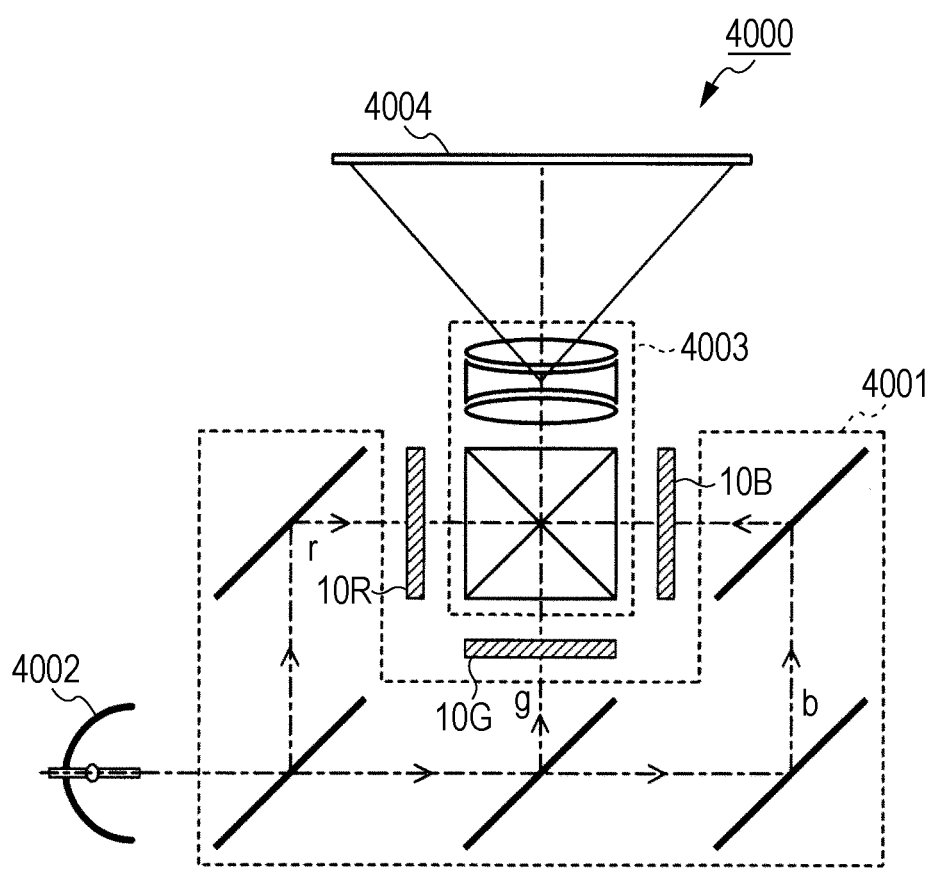
FIG. 9 is a perspective view illustrating an electronic apparatus (projection type display apparatus)
Figure 10:
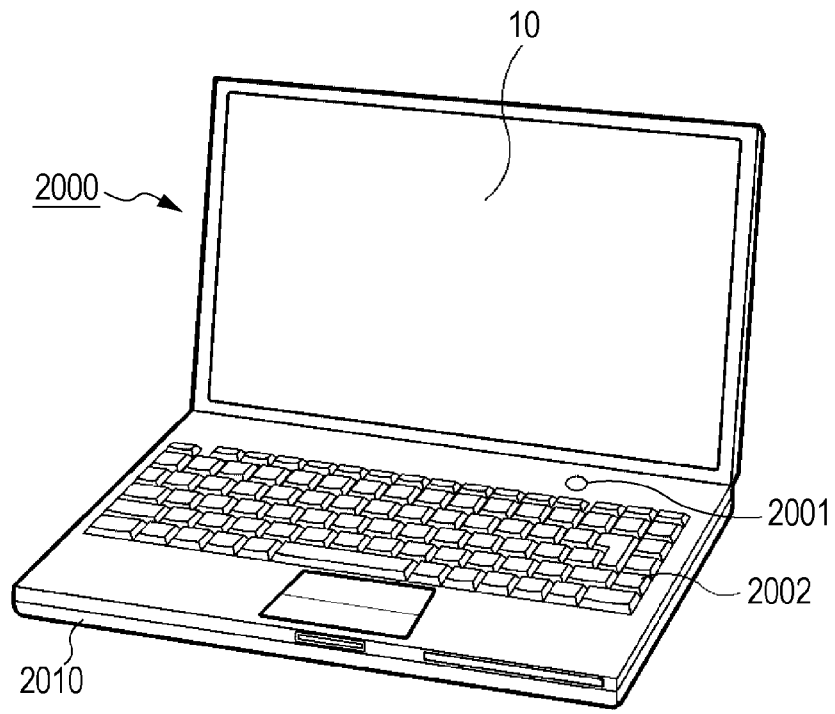
FIG. 10 is a perspective view illustrating an electronic apparatus (personal computer)
Figure 11:
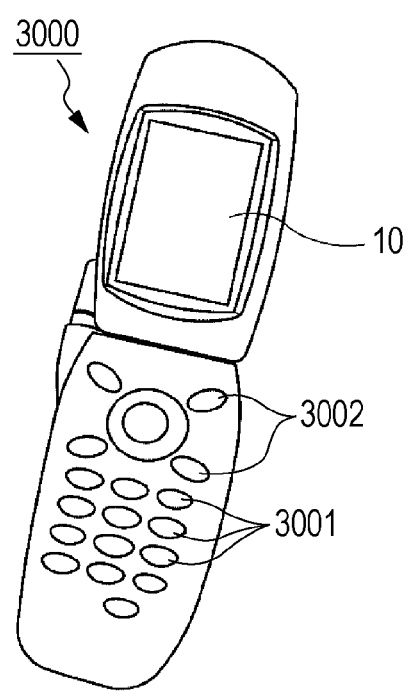
FIG. 11 is a perspective view illustrating an electronic apparatus (cellular phone)
Figure 12:
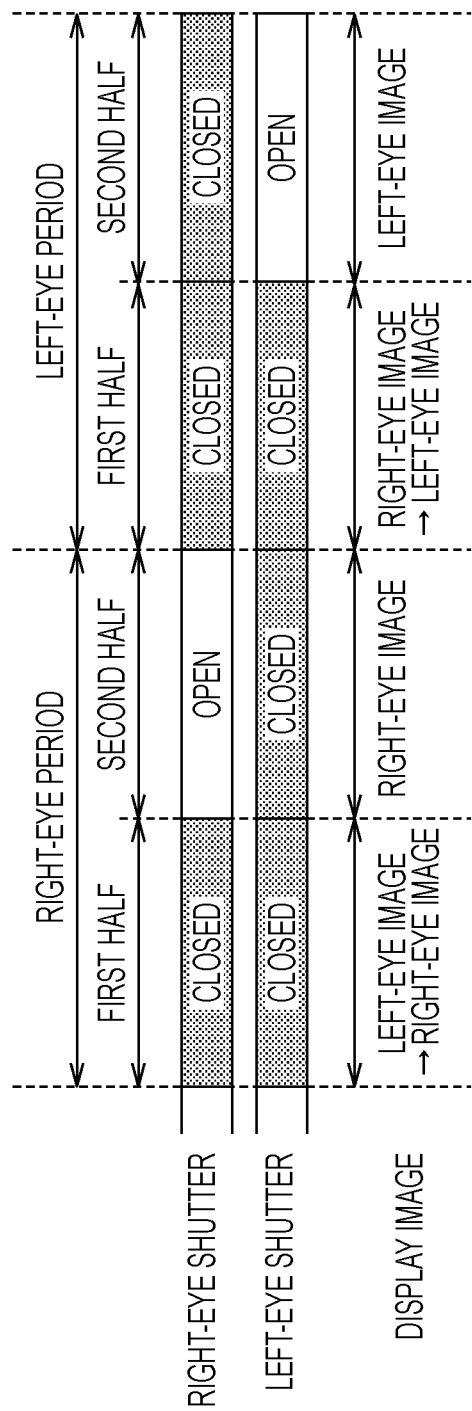
FIG. 12 is a diagram illustrating a stereoscopic viewing process of a technique according to the related art.

The electro-optic device 10 exemplified in each embodiment described above may be utilized in various electronic apparatuses. FIGS. 9 to 11 show specific electronic apparatuses in which the electro-optic device 10 may be utilized.

FIG. 9 is a schematic diagram illustrating a projection type display apparatus (three-plate type projector) 4000 to which the electro-optic device 10 is applied. The projection type display apparatus 4000 includes three electro-optic devices 10 (10R, 10G, and 10B) corresponding to different display colors (red, green, and blue). An illumination optical system 4001 supplies a red component r, a green component g, and a blue component b of light emitted from an illumination device (light source) 4002 to the electro-optic devices 10R, 10G, and 10B, respectively. Each electro-optic device 10 functions as an optical modulator (light valve) that modulates each single-color light supplied from the illumination optical system 4001 in accordance with a display image. A projection optical system 4003 synthesizes the light emitted from the respective electro-optic devices 10 and projects the synthesized light toward a projection surface 4004. The viewer perceives a stereoscopic image projected toward the projection surface 4004 using the stereoscopic glasses 20 (not shown in FIG. 9).

FIG. 10 is a perspective view illustrating a portable personal computer in which the electro-optic device 10 is utilized. A personal computer 2000 includes the electro-optic device 10 displaying various images and a body section 2010 in which a power switch 2001 and a keyboard 2002 are installed.

FIG. 11 is a perspective view illustrating a cellular phone to which the electro-optic device 10 is applied. A cellular phone 3000 includes a plurality of operation buttons 3001, scroll buttons 3002, and the electro-optic device 10 displaying various images. When the scroll buttons 3002 are operated, a screen displayed on the electro-optic device 10 is scrolled.

Examples of an electronic apparatus to which the electro-optic device according to the invention is applied include not only the electronic apparatuses exemplified in FIGS. 9 to 11 but also personal digital assistants (PDAs), digital still cameras, televisions, video cameras, car navigation apparatuses, in-vehicle displays (instrument panels), electronic pocket books, electronic papers, calculators, word processors, work stations, television telephones, POS terminals, printers, scanners, copy machines, video players, and apparatuses including a touch panel.

What is claimed is:

1. An electro-optic device alternately displaying right-eye and left-eye images, comprising:
    scanning lines;
    signal lines that intersect the scanning lines;
    pixels that are arranged to correspond to the intersections between the scanning lines and the signal lines and includes switching elements respectively, the switching elements turning on in response to the scanning signal which is supplied from the scanning lines;
    a scanning line driving circuit that simultaneously selects the scanning lines in accordance with each first combination formed by two scanning lines adjacent to each other in a first unit period, selects only one of the scanning lines of each first combination in a second unit period, simultaneously selects the scanning lines in accordance with each second combination formed by two scanning lines and shifted by one scanning line from the first combination in a third unit period, and simultaneously selects the scanning lines of each first combination in a fourth unit period, the first, second, third, and fourth unit periods being included in a display period in which the right-eye image and the left-eye image are displayed; and
    a signal line driving circuit that supplies the signal lines with a gray scale potential corresponding to an image signal of the pixels of the other scanning line of the first combination in the first unit period, supplies the signal lines with a gray scale potential corresponding to an image signal of the pixels of the one scanning line of each first combination in the second unit period, supplies the signal lines with a gray scale potential corresponding to an image signal of the pixels of the one scanning line of each second combination in the third unit period, and supplies the signal lines with the gray scale potential corresponding to the image signal of the pixels of the other scanning line of each first combination in the fourth unit period.

2. The electro-optic device according to claim 1, further comprising:
    stereoscopic glasses that include right-eye and left-eye shutters; and
    a glasses control circuit that controls both the right-eye and left-eye shutters to so as to cause them to be in a light-blocking state in the first unit periods of the display periods of the right-eye and left-eye images, controls the right-eye and left-eye shutters so as to cause them to be in a light-transmission state and the light-blocking state, respectively, in the second, third, and fourth unit periods of the display period of the right-eye image, and controls the left-eye and right-eye shutters to be in the light-transmission state and the light-blocking state, respectively, in the second, third, and fourth unit periods of the display period of the left-eye image.

3. The electro-optic device according to claim 1, wherein the signal line driving circuit sets a polarity of the gray scale potential with respect to a reference voltage to a first polarity in the first and second unit periods and sets the polarity of the gray scale potential with respect to the reference voltage to a second polarity reverse to the first polarity in the third and fourth periods.

4. The electro-optic device according to claim 1, wherein in each control period including the display period of the right-eye image and the display period of the left-eye image which occur in tandem, the signal line driving circuit reverses the polarities of the gray scale potentials of the first to fourth unit periods of the display periods to each other.

5. The electro-optic device according to claim 4, wherein in the first and second control periods are alternately repeated, the signal line driving circuit sets the polarities of the gray scale potentials with respect to the reference voltage to a first polarity in the first and second unit periods in the first control period, sets the polarities of the gray scale potentials to a second polarity reverse to the first polarity in the third and fourth unit periods in the first control period, sets the polarities of the gray scale potentials to the second polarity in the first and second unit periods in the second control period, and sets the polarities of the gray scale potentials to the first polarity in the third and fourth unit periods in the second control period.

6. An electro-optic device alternately displaying right-eye and left-eye images, comprising:
scanning lines;
signal lines that intersect the scanning lines;
pixels that are arranged to correspond to the intersections between the scanning lines and the signal lines and includes switching elements respectively, the switching elements turning on in response to the scanning signal which is supplied from the scanning lines;
a scanning line driving circuit that simultaneously selects the scanning lines in accordance with each first combination formed by two scanning lines adjacent to each other in a first unit period, selects only one of the scanning lines of each first combination in a second unit period, simultaneously selects the scanning lines in accordance with each second combination formed by two scanning lines and shifted by one scanning line from the first combination in a third unit period, and simultaneously selects the scanning lines of each first combination in a fourth unit period, the first and second, third, and fourth periods being included in a display period in which the right-eye image and the left-eye image are displayed, and in a display period in which the left-eye image is displayed; and
a signal line driving circuit that supplies the signal lines with a gray scale potential corresponding to an image signal of the pixels of the other scanning line of the first combination in the first unit period and supplies the signal lines with a gray scale potential corresponding to an image signal of the pixels of the one scanning line of the first combination in the second unit period, supplies the signal lines with a gray scale potential corresponding to an image signal of the pixels of either scanning line of each second combination in the third unit period, and supplies the signal lines with the gray scale potential corresponding to the image signal of the pixels of either scanning line of each first combination in the fourth unit period, the gray scale potential supplied in the third unit period being different from the gray scale potential supplied in the fourth unit period.

7. An electronic apparatus comprising the electro-optic device according to claim 1.

* * * * *